United States Patent
Mäkinen

(10) Patent No.: US 12,385,784 B2
(45) Date of Patent: Aug. 12, 2025

(54) TECHNIQUES FOR MEASURING SKIN TONE USING A WEARABLE DEVICE

(71) Applicant: Oura Health Oy, Oulu (FI)

(72) Inventor: Jukka Tapani Mäkinen, Oulu (FI)

(73) Assignee: Oura Health Oy, Oulu (FI)

( * ) Notice: Subject to any disclaimer, the term of this patent is extended or adjusted under 35 U.S.C. 154(b) by 235 days.

(21) Appl. No.: 18/150,016

(22) Filed: Jan. 4, 2023

(65) Prior Publication Data
US 2024/0219237 A1 Jul. 4, 2024

(51) Int. Cl.
*G01J 3/50* (2006.01)

(52) U.S. Cl.
CPC .................... *G01J 3/50* (2013.01)

(58) Field of Classification Search
CPC ...... G01J 3/50; G01J 3/0272; G01J 2003/102; G01J 3/0264; A61B 5/6802; A61B 5/02438; A61B 5/681; A61B 5/0205; A61B 5/0075
See application file for complete search history.

(56) References Cited

U.S. PATENT DOCUMENTS

| 2011/0112385 | A1* | 5/2011 | Aalders | ............... | A61B 5/0059 |
| | | | | | 356/300 |
| 2021/0275034 | A1* | 9/2021 | Frank | ............... | G01J 5/0265 |
| 2022/0054023 | A1* | 2/2022 | Gruber | ............... | A61B 5/6898 |
| 2023/0240591 | A1* | 8/2023 | De Bock | ............... | G16H 40/63 |
| | | | | | 600/306 |
| 2023/0255545 | A1* | 8/2023 | Boamfa | ............... | A61B 5/0077 |
| | | | | | 600/476 |
| 2024/0138728 | A1* | 5/2024 | Dietiker | ............... | A61B 5/7246 |

FOREIGN PATENT DOCUMENTS

| CN | 111093487 A | * | 5/2020 | ........... | A61B 5/0205 |
| WO | WO-2021103008 A1 | * | 6/2021 | ........... | A61B 5/0205 |

OTHER PUBLICATIONS

Translation of CN_111093487 (Year: 2020).*
WO_2021103008_A1, Translation (Year: 2021).*

* cited by examiner

*Primary Examiner* — Tarifur R Chowdhury
*Assistant Examiner* — Carlos Perez-Guzman
(74) *Attorney, Agent, or Firm* — Holland & Hart LLP

(57) ABSTRACT

Methods, systems, and devices for measuring a skin tone using a wearable device are described. The method may include the wearable device transmitting, using one or more light-emitting components, first light associated with a first wavelength, second light associated with a second wavelength, and third light associated with a third wavelength and generating a first signal, a second signal, and a third signal based on the first light, the second light, and the third light, respectively, received at one or more photodetectors of the wearable device, Further, the method may include the wearable device determining a first difference between the first signal and the second signal, and a second difference between the first signal and the third signal and determining a skin tone metric associated with the user based on a comparison between the first difference and the second difference.

18 Claims, 9 Drawing Sheets

TECHNIQUES FOR MEASURING SKIN TONE USING A WEARABLE DEVICE

FIELD OF TECHNOLOGY

The following relates to wearable devices and data processing, including techniques for measuring skin tone using a wearable device.

BACKGROUND

Some wearable devices may be configured to collect data, such as physiological data, from a user of the wearable device. For example, the wearable device may include one or more optical components to collect physiological data from the user. To determine physiological data using optical components, the wearable device may analyze one or more characteristics of light (e.g., signal strength, signal intensity, absorption, reflectance, etc.) that is transmitted and received using the one or more optical components. However, variable attributes of the user (e.g., skin tone) may introduce noise when collecting the physiological data from the user using the optical components which may decrease the accuracy of the physiological data.

DETAILED DESCRIPTION

Figure 1:
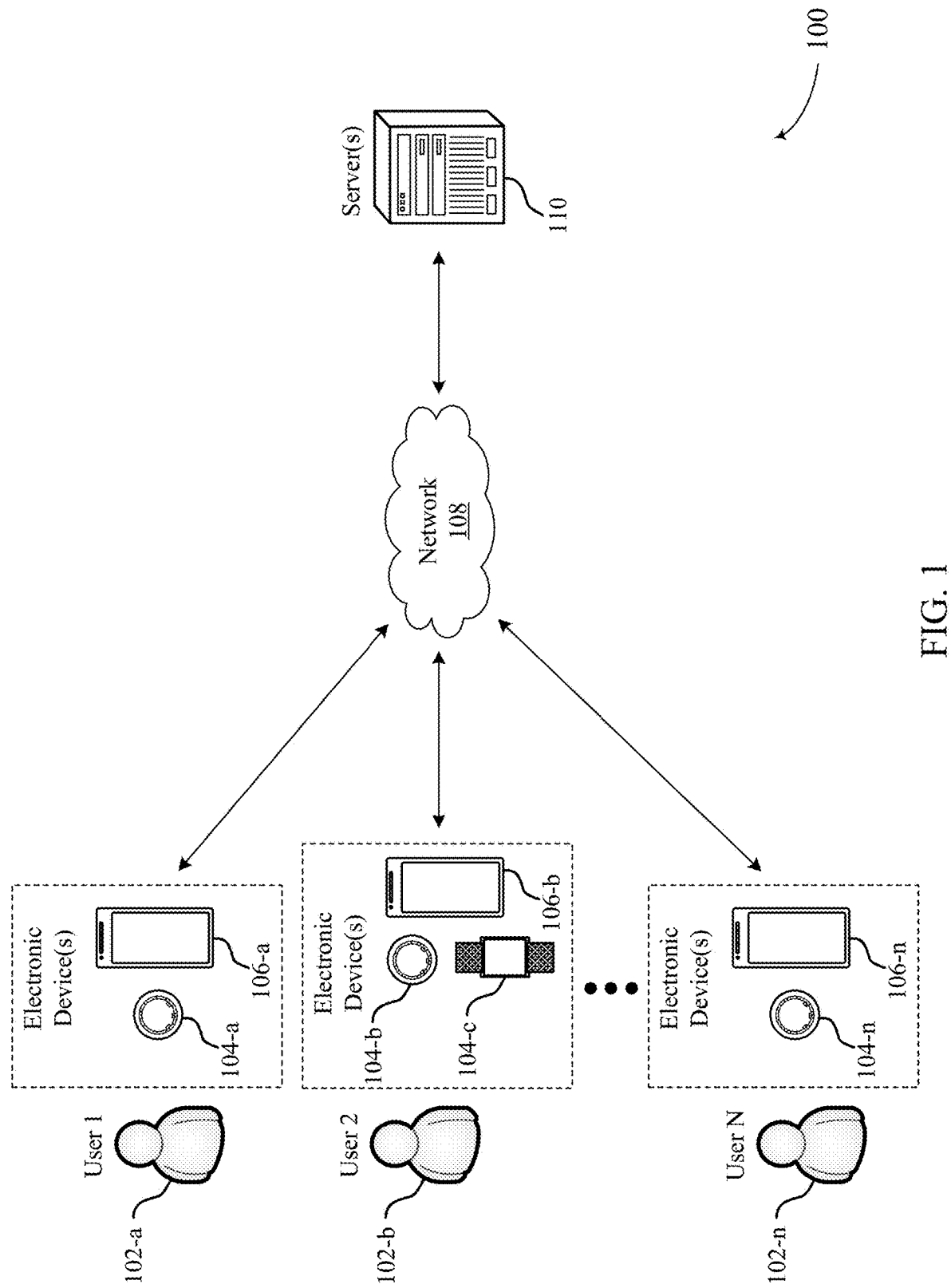
FIG. 1 illustrates an example of a system that supports techniques for measuring skin tone using a wearable device in accordance with aspects of the present disclosure.

A wearable device may be configured to collect physiological data from a user so that a user may monitor various aspects of their health. For example, the wearable device may collect heart rate data, sleep data, blood pressure data, and the like. In order to collect the physiological data from the user, the wearable device may include one or more optical sensors. For example, a wearable device may transmit light using one or more light-emitting components positioned at a first location of the wearable device, and may receive the transmitted light using one or more photodetectors positioned at a second location of the wearable device. In some examples, the wearable device may be an example of a ring, and the optical sensors (e.g., light-emitting components, photodetectors) may be positioned along the inside housing of the ring such that the light travels through or reflects off of one or more layers of the user's finger.

In one example, the wearable device may collect physiological data related to a blood oxygen saturation metric for the user. In such examples, the wearable device may transmit light signals (e.g., a red light signal and an IR light signal) through blood vessels of the finger and measure a signal strength (or signal intensity) of the received light signals in order to determine the blood oxygen saturation metric. However, other factors (e.g., factors other than an oxygen content of the blood) may contribute to the signal strength of the received light signals. For example, the user's skin tone may contribute to the signal strength of the received light signals. For instance, darker skin tones may absorb more light as compared to lighter skin tones, which may affect the amount of light received at the photodetectors, and therefore affect the determined blood oxygen saturation metrics. As such, failing to account for varying skin tones may increase the inaccuracy of the physiological data collected using optical components.

Accordingly, aspects of the present disclosure are directed to a wearable device that is configured to collect skin tone metrics from the user to calibrate other physiological data. In particular, varying skin tones (e.g., varying levels of melanin) have been found to exhibit varying levels of absorption for different wavelength ranges. In this regard, comparison of absorption rates between different wavelength ranges may be used to estimate a user's skin tone. As such, aspects of the present disclosure are directed to wearable devices that are configured to compare absorption rates (e.g., absorption coefficients) of multiple wavelength ranges to estimate a skin tone metric, where estimated skin tone metrics may be used to calibrate physiological measurements, adjust measurement parameters for acquiring physiological measurements, and the like.

In some examples, the wearable device may include one or more optical transmitters (e.g., light-emitting components) and one or more optical receivers (e.g., photodetectors). For example, the wearable device may be an example of a ring and may include at least one optical transmitter and one optical receiver located along the inner-housing of the ring facing the palm-side of the user's finger. Using the optical transmitter, the wearable device may transmit first light associated with a first wavelength range (e.g., IR light), second light associated with a second wavelength range (e.g., green light), and third light associated with a third wavelength range (e.g., red light). Further, using the optical receiver, the wearable device may receive the first light, the second light, and third light, and the wearable device may generate a signal for each of the respective received light. As an example, the wearable device may generate a first signal, a second signal, and a third signal that indicates a signal strength (or a signal intensity) of the received first light, second light, and the third light, respectively.

The wearable device may then determine a first difference between the first signal (e.g., IR light) and the second signal (e.g., red light) and a second difference between the first signal (e.g., IR light) and the third signal (e.g., green light). The first light (e.g., IR light) may be associated with a lower variability in light absorption when compared to the second light and the third light for a wide range of skin tones and therefore, may act as a reference point. In other words, varying skin tones may absorb IR light at approximately the same level, meaning that IR absorption may be used as a reference point that is used to compare absorption levels (and therefore skin tone metrics) for other wavelength ranges. As such, by comparing the differences between red and green light absorption relative to IR absorption, techniques described herein may be used to estimate a skin tone metric for the user.

In additional or alternative implementations, wearable devices described herein may be configured to determine or estimate skin tone metrics for the user using only two wavelengths. For example, in some cases, the wearable device may transmit red and green light, determine a difference between signals generated based on received red/green light, and determine a skin tone metric for the user based on the difference in the two signals. In some cases, the use of light associated with three different wavelengths may enable the wearable device to compensate for different absorption rates of the respective wavelengths of light that is caused by varying blood oxygen saturation metrics, which may result in more accurate measurement of skin tone metrics. However, as will be described in further detail herein, such uncertainty that may be caused by varying blood oxygen saturation may be reduced or eliminated using two different wavelengths of light that are associated with isosbestic points as references. That is, isosbestic points between oxyhemoglobin and deoxyhemoglobin may be used as reference points that enable skin tone metrics to be measured using only two wavelengths of light.

Upon determining a skin tone metric for the user, the wearable device may adjust one or more measurement parameters of the wearable device based on the skin tone metric. For example, the wearable device may adjust a power level of the optical transmitter, adjust a burn-time of the optical transmitter, or adjust an algorithm for analyzing the light received by the optical receiver such that the wearable device may account for the user's skin tone when collecting other physiological data for the user (e.g., blood oxygen saturation data). For instance, in the case of darker skin tone metrics that exhibit higher absorption rates, the wearable device may increase a power level applied to light-emitting components in order to account for the higher absorption levels and increase the quality of physiological data collected via the wearable device. Conversely, in the case of lighter skin tone metrics that exhibit lower absorption rates, the wearable device may decrease a power level applied to light-emitting components in order to reduce the power consumption of the wearable device. Accordingly, aspects of the present disclosure may allow a wearable device to increase the accuracy of the physiological data for the user and/or reduce the power consumption of the wearable device.

Aspects of the disclosure are initially described in the context of systems supporting physiological data collection from users via wearable devices. Additional aspects of the disclosure are described in the context of a graph. Aspects of the disclosure are further illustrated by and described with reference to apparatus diagrams, system diagrams, and flowcharts that relate to techniques for measuring skin tone using a wearable device.

FIG. 1 illustrates an example of a system 100 that supports techniques for measuring skin tone using a wearable device in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for measuring skin tone using the wearable device 104. The wearable device 104 may utilize one or more light-emitting components (e.g., LEDs or laser diodes) of the wearable device 104 to measure the skin tone of the user 102. In one example, a single light-emitting component of the wearable device 104 may be capable of transmitting light signals associated with different wavelengths. For example, the single light-emitting component may be capable of transmitting a green light, a red light, and an IR light (in such cases, the light-emitting component may be referred to as a "triple-LED"). In conjunction with the one or more light-emitting components, the wearable device 104 may include one or more photodetectors. The one or more photodetectors may be configured to receive the light signals transmitted by the light-emitting component(s). In some examples, a light-emitting component and a corresponding photodetector may be positioned along the inner surface of the wearable device 104 such that a light signal transmitted from the light-emitting component travels through or is reflected from the upper-layers of the epidermis of the finger to the photodetectors. Further, the light-emitting component and the corresponding photodetector may be located on the palm-side of the user finger.

Using the light-emitting component, the wearable device 104 may transmit a red light signal, a green light signal, and an IR light signal and receive the red light signal, the green light signal, and the IR light signal using the corresponding photodetector. The light-emitting component may transmit the red light signal, the green light signal, and the IR signal at different time intervals or during overlapping time intervals. Upon receiving the light signals, the wearable device 104 may determine one or more characteristics of the received light signals. As one example, the wearable device 104 may determine an amount of light that has been absorbed from the received light signal when compared to the transmitted light signal (e.g., light intensity of the received light signal). The wearable device 104 may then generate a measurement signal for each of the received light signals indicating the determined characteristic and compare the measurement signals to one another. In some examples, the IR light signal may be less susceptible to changes in skin tone and therefore, the measurement signals corresponding to the received green light signal and the red light signal may be compared to the measurement signal corresponding to the received IR light signal.

Upon comparing the measurement signals, the wearable device 104 may determine a skin tone metric for the user 102. The skin tone metric may be indicative of an amount of melanin present in the upper layers of the user's epidermis. Using the skin tone metric, the wearable device 104 may calibrate other physiological data collected for the user 102 to account for varying light absorption rates associated with the user's skin tone. Additionally, or alternatively, the wearable device 104 may utilize the skin tone metric along with other metrics to determine physiological metrics for the user 102. For example, the wearable device 104 may utilize the skin tone metric along with temperature metrics to determine a blood flow metric associated with the user 102. By determining the skin tone metric, the wearable device 104 may collect more accurate physiological data from the user 102 which may allow the user 102 to monitor various aspects of their health with more precision.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
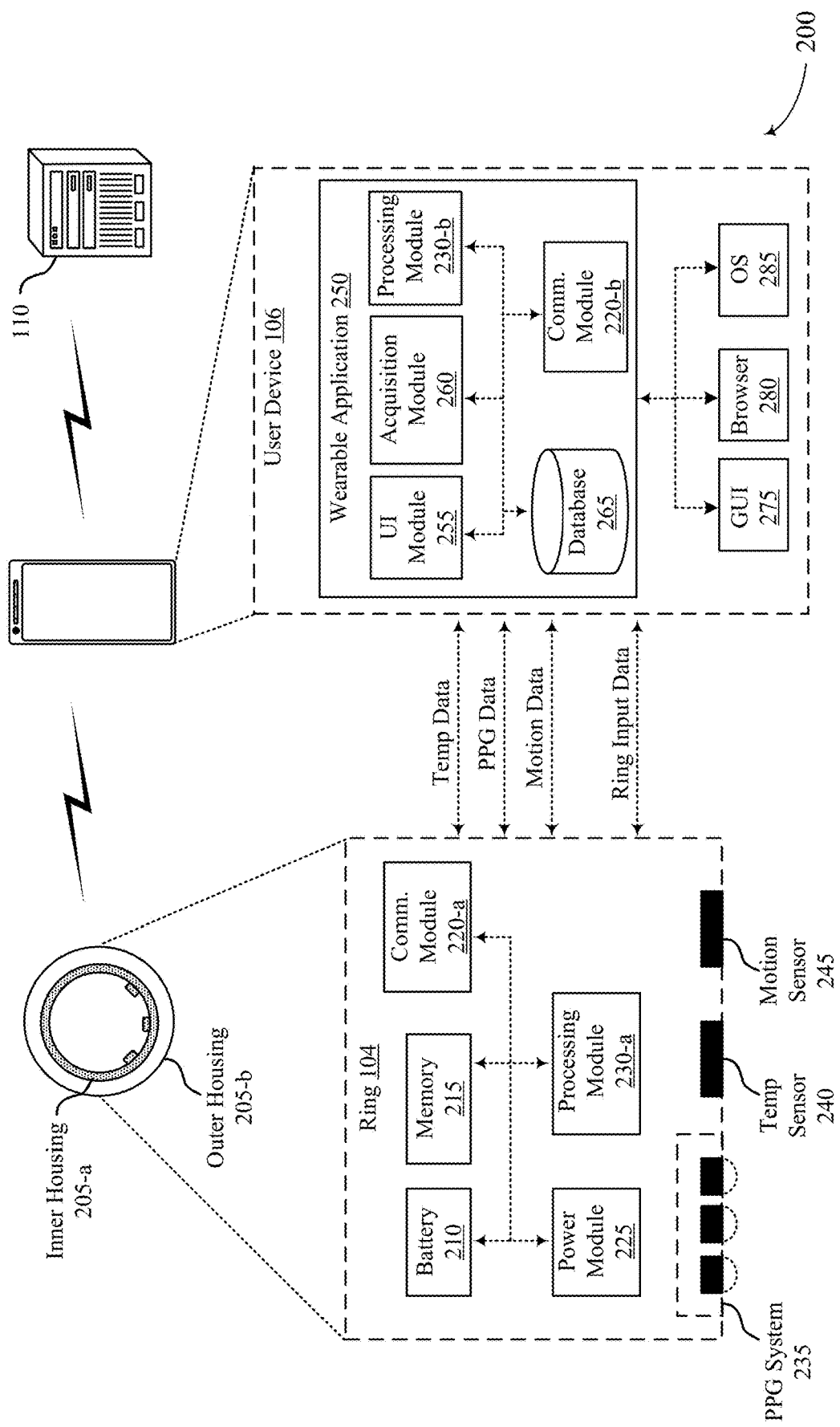
FIG. 2 illustrates an example of a system that supports techniques for measuring skin tone using a wearable device in accordance with aspects of the present disclosure.

FIG. 2 illustrates an example of a system 200 that supports techniques for measuring skin tone using a wearable device in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs) or laser diodes (e.g., vertical cavity surface-emitting lasers (VCSELs)). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the *IBIs*. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMl160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-a may compress the data stored in memory 215. For example, the processing module 230-a may delete sampled data after making calculations based on the sampled data. As another example, the processing module 230-a may average data over longer periods of time in order to reduce the number of stored values. In a specific example, if average temperatures for a user over one minute are stored in memory 215, the processing module 230-a may calculate average temperatures over a five minute time period for storage, and then subsequently erase the one minute average temperature data. The processing module 230-a may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for measuring skin tone using the ring 104. The PPG system 235 may include an optical receiver and an optical transmitter. The optical transmitter may transmit different wavelengths of light. For example, the optical transmitter may transmit red light, green light, and IR light. Upon receiving the red light, the green light, and the IR light, the optical receiver may generate a signal (e.g., a PPG signal) for each of the transmitted lights. For example, the optical receiver (e.g., photodetector) may generate a first signal for the IR light, a second signal for the green light, and a third signal for the red light.

The optical receiver may then transmit the signals to the processing module 230-a. the processing module 230-a may compare the first signal to the third signal and determine a first difference. Further, the processing module 230-a may compare the first signals to the second signal and determine a second difference. In some examples, the first difference and the second difference may be stored at the memory 215. Upon determining the first difference and the second difference between the generated signals, the processing module 230-a may determine a skin tone metric for the user and adjust aspects of the optical transmitter using the skin tone metric. Further, the processing module 230-a may compare the skin tone metric with past skin tone metrics to determine an orientation of the ring 104. If the skin metrics are different from the past skin tone metrics, an orientation of the ring 104 may have changed (e.g., the ring 104 may have rotated on the user's finger). Using the above methods, the ring 104 may identify a skin tone metric of the user and utilize the skin tone metric to calibrate other physiological measurements collected by the ring 104 or determine an orientation of the ring which may increase an accuracy of the physiological data.

Figure 3:
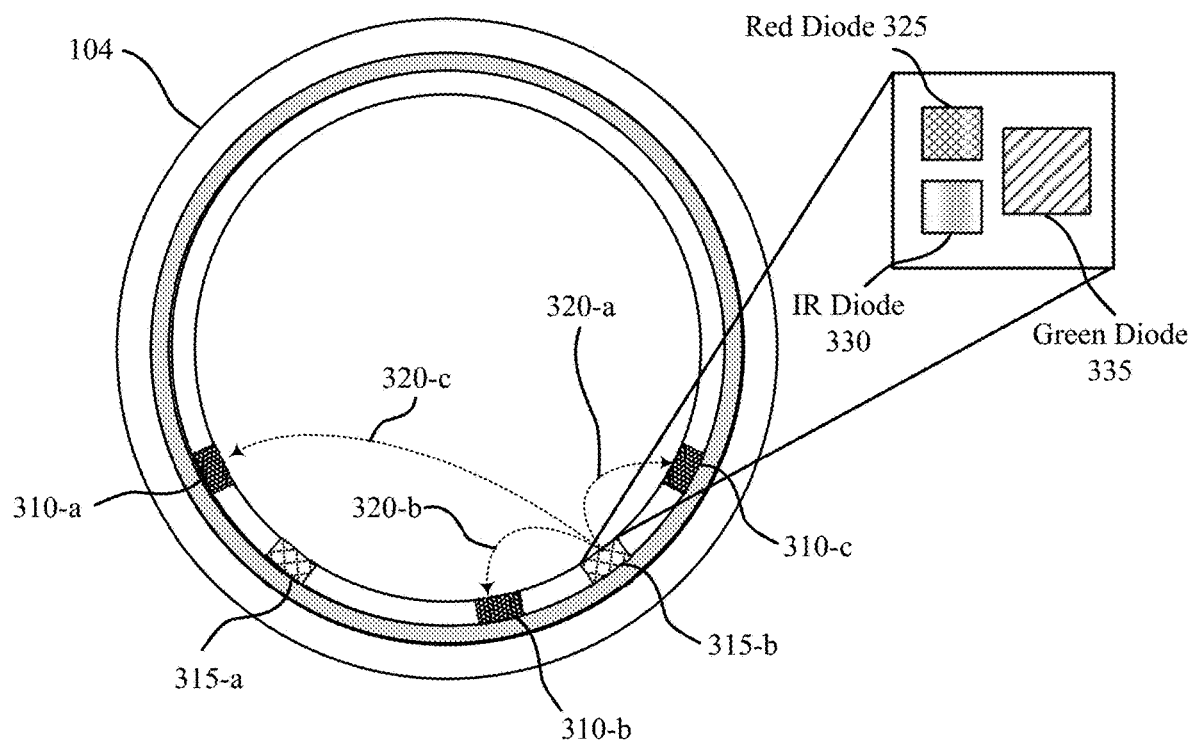
FIG. 3 illustrates an example of a system that supports techniques for measuring skin tone using a wearable device in accordance with aspects of the present disclosure.
Figure 3:
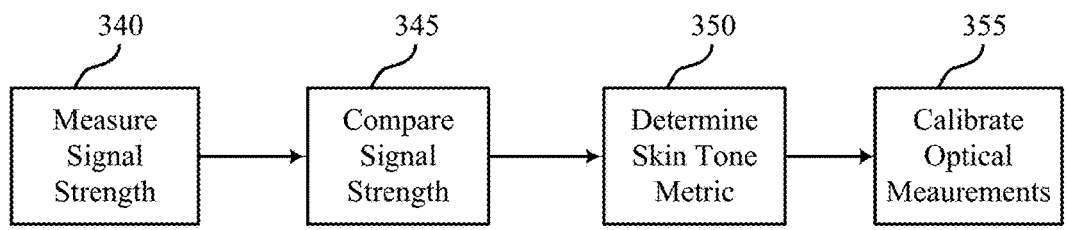

FIG. 3 illustrates an example of a system 300 that supports techniques for measuring skin tone using a wearable device in accordance with aspects of the present disclosure. In some examples, aspects of the system 300 may implement, or be implemented by, aspects of a system 100 and a system 200. For example, the system 300 may include a wearable device 104 which may be an example of a wearable device 104 or a ring 104 as described with reference to FIGS. 1 and 2. In some examples, the wearable device 104 may include multiple components. For example, the wearable device 104 may include one or more optical transmitters 315 (e.g., an optical transmitter 315-*a* and an optical transmitter 315-*b*) and one or more optical receivers 310 (e.g., an optical receiver 310-*a*, an optical receiver 310-*b*, and an optical receiver 310-*c*) which may be examples of optical transmitters (e.g., light-emitting components, such as LEDs or laser diodes) and optical receivers (e.g., photodetectors) included in a PPG system 235 as described with reference to FIG. 2.

In some examples, the wearable device 104 may utilize the one or more components to determine physiological measurements of a user. Physiological measurements may include temperature measurements, accelerometer measurements, heart rate measurements, HRV measurements, blood oxygen measurements, etc. In some examples, the wearable device 104 may utilize the one or more optical transmitters 315 and the one or more optical receivers 310 to determine the physiological measurements. For example, as shown in FIG. 3, the wearable device 104 may include the optical transmitter 315-*a* and the optical transmitter 315-*b*. Further, the wearable device 104 may include the optical receiver 310-*a*, the optical receiver 310-*b*, and the optical receiver 310-*c*. The optical transmitters 315 and the optical receivers 310 may be mounted along an inner circumferential surface of the wearable device 104 such that the optical transmitters 315 and the optical receivers 310 are in contact with the underside of the user's finger (e.g., palm-side of the user's finger).

Each optical transmitter 315 of the wearable device 104 may include one or more light-emitting components or diodes that emit light. For example, the optical transmitters 315 may include, but are not limited to, LEDs, VCSELs, and the like. In some aspects, VCSELs may include monolithic semiconductor lasers that emit light in a vertical direction or emit light perpendicular to the surface of the wearable device 104. VCSELs may support a narrower spectral width and/or a narrower angular distribution when compared to LEDs. The narrower spectral widths and/or narrower angular light distribution of VCSELs may prevent or lower a proportion of stray light (e.g., light not going through the user's finger) and improve measurement accuracy.

In one example, the optical transmitters 315 may include a red diode 325, an IR diode 330, and a green diode 335. The red diode 325 may be operable to transmit light that is associated with a wavelength range of approximately 660 nm, the IR diode 330 may be operable to transmit light that is associated with a wavelength range of approximately 940 nm, and the green diode 335 may be operable to transmit light that is associated with a wavelength range of approximately 530 nm. To determine the physiological measurements of the user, the optical transmitter 315 may transmit light using one or more of the diodes. As one example, the optical transmitter 315 may transmit light using the red diode 325 during a first duration and transmit light using the IR diode 330 during a second time duration that is after the first time duration.

The light transmitted by the optical transmitters 315 can be received at one or more of the optical receivers 310. For example, the light from optical transmitter 315-*b* can be received by one or more of the optical receiver 310-*a*, the optical receiver 310-*b*, or the optical receiver 310-*c*. Further, because the diodes are within a same optical transmitter 315 (e.g., spatially located at approximately a same physical location), the light from different diodes may follow a same signal path 320 to a respective optical receiver 310. For example, light transmitted from the diodes of optical transmitter 315-*b* may follow a signal path 320-*a*. Additionally, or alternatively, light transmitted from the diode of optical transmitter 315-*b* may follow a signal path 320-*b* or a signal path 320-*c*. Different signal paths 320 may allow the light to path through or reflect off of different layers of the user's finger, and may exhibit varying penetration depths into the user's finger. For example, the signal paths 320-*a* and the signal path 320-*b* may allow the signal to pass through or reflect off of the upper epidermal layers of the finger, whereas the signal path 320-*c* may allow the light to pass through of reflect off of the epidermal layers of the finger as well as arterioles and bone of the finger.

The optical receivers 310 may receive the light transmitted from the optical transmitters 315 and measure a signal strength of the light (e.g., signal intensity of the light). As one example, the optical transmitter 315-*a* may transmit light using the red diode 325 and may also transmit light using the IR diode 330. The optical receiver 310-*a* may receive the light transmitted by the red diode 325 and the light transmitted by the IR diode 330 and determine a signal strength for each of the respective lights (or determine an amount of light that was absorbed by the tissue in the finger during transmission or reflection of each of the respective lights). From this, the optical receiver 310-*a* (or a processing module coupled to the optical receiver 310-*a*) may determine SpO2 measurements for the user (e.g., an amount of oxygen being carried by the blood), among other measurements.

However, in some examples, one or more unique characteristics of the user may skew or introduce some error when determining physiological measurements using optical components of the wearable device 104. For example, human skin may vary greatly in skin tone from one user to the next. The tone of human skin may depend on an amount of melanin present in the top epidermal layers of the skin, and the more melanin that is present in the top epidermal layers, the darker the skin tone and the more light the melanin absorbs. Certain types of light wavelengths may be more susceptible to melanin absorption. For example, red light (e.g., wavelength of 660 nm) and green light (e.g., wavelength of 530 nm) may be more susceptible to melanin absorption compared to IR light (e.g., wavelength of 940 nm). That is, a greater amount of red light and green light will be absorbed by melanin when compared to IR light. Moreover, the absorption level for different wavelength ranges (e.g., red and green light) may vary significantly with varying skin tones. Accordingly, because physiological measurements (e.g., SpO2) rely on signal strength measurements of one or all of IR light, red light, or green light, a variation in IR light, red light, and green light absorption as a result of a variation in melanin may negatively impact the physiological measurements.

As such, the wearable device 104 illustrated in FIG. 3 may be configured to determine skin tone measurements and utilize the skin tone measurements to calibrate other optical measurements (e.g., SpO2 measurements). In some examples, the optical transmitter 315-*b* may utilize the red diode 325 to transmit a first light, utilize the IR diode 330 to transmit a second light, and utilize the green diode 335 to transmit a third light and the first light, the second light, and the third light may be received at the optical receiver 310-*b* over the signal path 320-*b*. In one example, the optical transmitter 315 may transmit the first light, the second light, and the third light sequentially during different time intervals. For example, the optical transmitter 315-*b* may transmit the first light during a first duration, the second light during a second time interval that is after the first time interval, and the third light during a third time interval that is after the second time interval. Alternatively, the optical transmitter 315-*b* may transmit the first light, the second light, and the third light during a same time interval or overlapping time intervals (e.g., using a pixelated sensor or a wide-spectrum LED). In some examples, the first light, the second light, and the third light may be transmitted to the optical receiver 310-*b* over the signal path 320-*b* as opposed to the optical receiver 310-*a* over the signal path 320-*c* because the signal path 320-*c* passes through a pulsating vein of the user's finger and may introduce some noise to the skin tone measurement. In some examples, the signal path 320-*a* may also be used for skin tone measurement.

The first light, the second light, and the third light may travel through one or more layers of the finger (e.g., upper epidermal layers of the finger) and may be reflected back to the optical receiver 310-*b* (e.g., scattered reflection). Upon receiving the first light, second light, and the third light, the wearable device 104 may perform the skin tone measurement and determine one or more skin tone metrics for the user of the wearable device 104. For example, at 340, the optical receiver 310-*b* may determine an amount of each of the first light, the second light, and the third light received by the optical receiver 310-*b* and generate one or more signals indicating the amounts. As one example, the optical receiver 310-*b* may generate a first signal indicating a signal strength of the first light, a second signal indicating a signal strength of the second light, and a third signal indicating a signal strength of the third light. In some examples, the optical receiver 310-*b* may pass the signals to different components of the wearable device for processing (e.g., a processing module of the wearable device 104). Further, the signals may be stored at the wearable device 104 (e.g., in memory).

Further, at 345, the wearable device 104 may compare the signals to one another (e.g., using the processing module). In some examples, the third signal (e.g., IR signal strength) may act as a base line or a reference for the other signals. In particular, varying skin tones have been found to exhibit approximately the same absorption levels for IR light, meaning that the signal strength for the IR light may be used as a "reference" for most users.

For example, the optical receiver 310-*b* may compare the first signal (e.g., IR) to the third signal (e.g., red) and determine a first difference between the first signal and the third signal. Additionally, the optical receiver 310-*b* may compare the first signal (e.g., IR) to the third signal (e.g., green) and determine a second difference between the second signal and the third signal. In some examples, the first difference and the second difference may be expressed as a ratio or a percentage. For example, the optical receiver 310-*b* may measure the reflectance factor of each of the first light, the second light, and the third light. In some examples, the difference in the reflectance factor between the first light and the third light may be 0.15 or 15% with the third light having the higher reflectance factor.

Subsequently, at 350, the system 300 (e.g., wearable device 104, user device 106, servers 110) may be configured to determine a skin tone metric for the user based on the comparisons of the signal strengths (e.g., based on the absorption ratios between red and IR and between green and IR). In particular, with varying skin tones, the IR absorption rate will remain approximately the same, while the absorption rates for green and red light will change at varying rates. As such, the varying absorption rates of green and red light (relative to the IR baseline) may be a result of varying skin tone metrics. In other words, the differences between the received light signals may represent the one or more skin tone metrics for the user. The various absorption rates for differing wavelengths as a function of skin tones will be further shown and described with reference to FIG. 4.

After determining the one or more skin tone metrics associated with the user, the wearable device 104 may adjust one or more measurement parameters associated with the user using the one or more skin tone metrics at 355. For example, the wearable device 104 may adjust a power level associated with the optical transmitter 315-*b* or a burn time (e.g., how long light is emitted) associated with the optical transmitter 315-*b* when performing future physiological measurements using the optical transmitter 315-*b*. As an example, the wearable device 104 may increase or decrease a power level of the optical transmitter 315 when transmitting the first light or the second light. The wearable device 104 may determine an amount to increase or decrease the power level of first light or the second light using the one or more skin tone metrics, respectively.

For example, in the case of darker skin tone metrics that exhibit higher absorption rates, the wearable device 104 may increase a power level applied to the optical transmitter 315-*b* in order to account for the higher absorption levels and increase the quality of physiological data collected via the wearable device 104. Conversely, in the case of lighter skin tone metrics that exhibit lower absorption rates, the wearable device 104 may decrease a power level applied to the optical transmitter 315-*b* in order to reduce the power consumption of the wearable device 104. For instance, the wearable device 104 may increase the power level of the optical transmitter 315-*b* by 15% when transmitting the first light due to the difference between the first light and the third light being 15%.

In some examples, the wearable device 104 may perform one or more physiological measurements using the adjusted one or more measurement parameters such that the physiological measurements account for the skin tone of the user. As one example, the wearable device 104 may perform an SpO2 measurement. To perform the SpO2 measurement, the wearable device 104 may utilize the optical transmitter 315-*b* to transmit the first light (e.g., IR light) and the third light (e.g., red light) and the wearable device 104 may receive the first light and the third light at the optical receiver 310-*a* over the signal path 320-*c* (e.g., signal path through the pulsating vein of the user's finger). In such examples, during transmission of the first light, the optical transmitter 315-*b* may be power adjusted or a burn time associated with the optical transmitter 315-*b* may be adjusted according to the skin tone metric associated with the first light.

Alternatively, at 355, the wearable device 104 may adjust an algorithm for analyzing the light received by the optical receiver 310 used to perform the one or more physiological measurements to account for the skin tone of the user. As one example, the wearable device 104 may perform an SpO2 measurement. To perform the SpO2 measurement, the wearable device 104 may utilize the optical transmitter 315-*b* to transmit the first light and the third light and the wearable device 104 may receive the first light and the third light at the optical receiver 310-*a* over the signal path 320-*c*. Further, the wearable device 104 may determine a signal strength of the first light and a signal strength of the third light. In such examples, the wearable device 104 may adjust the signal strength of the first light adjusted according to the skin tone metric associated with the first light. For example, the wearable device 104 may increase the signal strength by 15% due to the difference between the first light and the third light being 15%. After adjusting the signal strength, the wearable device 104 may utilize the adjusted signal strength of the first light to determine the SpO2 metric. By performing such adjustments, other factors affecting signal intensity (e.g., skin tone or skin thickness) may be calibrated out, or otherwise accounted for. It may also be noted that other physiological metrics (e.g., other than SpO2 metrics) may be calibrated using the one or more skin tone metrics.

Conversely, in some examples, the wearable device 104 may utilize physiological data associated with the user to calibrate or adjust the one or more skin tone metrics. For example, the wearable device 104 may determine an SpO2 metric. A value of the SP02 metric may have an effect on the amount of IR light and red light received at the optical transmitter 315 of the wearable device 104. As such, the wearable device 104 may utilize the SpO2 metric to determine the one or more skin tone metrics (e.g., signal strength of the first light or the third light). For example, the wearable device 104 may account for the absorption of the IR light and the red light caused by the value of the SpO2 metric to determine the absorption of the IR light and the red light caused by the skin tone of the user. The value of the SpO2 metrics may stay fairly constant (e.g., approximately 97%) which may allow the wearable device 104 to more accurately determine the skin tone metric because the wearable device 104 may estimate the oxygenation effects to red light and IR light.

In additional or alternative implementations, wearable devices described herein may be configured to determine or estimate skin tone metrics for the user using only two wavelengths. For example, in some cases, the wearable device 104 may transmit yellow light (e.g., wavelength of approximately 590 nm) and orange light (e.g., wavelength of approximately 805 nm) to determine the skin tone metric for the user. Yellow and orange light are located approximately at isosbestic points/wavelengths between oxyhemoglobin and deoxyhemoglobin (e.g., at approximately 590 nm and 805 nm). At these wavelengths, the absorption of oxyhemoglobin and deoxyhemoglobin does not change. As such, at these wavelengths, a change in absorption may be determined to be largely (or only) attributable to a change in the skin tone of the user and thus, the skin tone metric can be determined. As such, in this example, the wearable device 104 may determine a first signal associated with received yellow light, and a second signal associated with received orange light, and may determine a skin tone metric for the user based on the difference in the two signals.

In some cases, as described herein, the use of light associated with three different wavelengths (as opposed to using light associated with only two wavelengths) may enable the wearable device 104 to compensate for different absorption rates of the respective wavelengths of light that is caused by varying SpO2 metrics, which may result in more accurate measurement of skin tone metrics. However, such uncertainty that may be caused by varying SpO2 metrics may be reduced or eliminated using two different wavelengths of light that are associated with isosbestic points as references (e.g., yellow light at 590 nm and orange light at 805 nm). That is, isosbestic points between oxyhemoglobin and deoxyhemoglobin may be used as reference points that enable skin tone metrics to be measured using only two wavelengths of light.

In some aspects, the wearable device 104 may utilize the one or more skin tone metrics to determine one or more characteristics of the wearable device 104. As one example, the wearable device 104 may determine an orientation of the wearable device 104 with respect to the user's finger using the one or more skin tone metrics. Some physiological measurements may rely on a particular orientation of the wearable device 104. For example, the wearable device 104 may perform more accurate physiological measurements when the components of the wearable device 104 (e.g., optical transmitters 315, optical receivers 310, temperature sensors, or motion sensors) are situated along the bottom portion of the wearable device 104 and on the underside of the user's finger (e.g., on the palm-side of the user's finger). For most users, the skin on the palm-side of the fingers exhibit lighter skin tone metrics as compared to the skin on the back of the user's hand/fingers.

To determine an orientation of the wearable device 104, the wearable device 104 may determine baseline skin tone metrics for the user. The baseline skin tone metrics may be a signal strength of the first light, the second light, and the third light when the wearable device 104 is in the preferred position (e.g., components are situated on the palm-side of the user's finger). Upon determining the baseline skin tone metrics, the wearable device 104 may compare the baseline skin tone metrics to future skin tone metrics determined by the wearable device 104. As an example, the wearable device 104 may determine skin tone metrics for the user periodically and compare the skin tone metrics determined at each periodic occasion to the baseline skin tone metrics. If a difference between one or more of the baseline skin tone metrics and one or more of future skin tone metrics satisfies a threshold, the wearable device 104 may determine a change in the orientation of the wearable device.

In some examples, an underside of the user's finger may be lighter than a topside of the user's finger as a result of the top-side of the user's finger being more exposed to the sun than the underside of the user finger. As such, varying skin tone metrics may be used to determine whether the wearable device 104 has rotated on the user's finger. For instance, if the wearable device 104 determines a skin tone metric that is much darker than the user's baseline skin tone metric determined for the palm-side of the user's finger, the wearable device 104 may determine that the wearable device 104 has rotated such that the optical components/sensors are facing the back side of the user's finger that has a darker skin tone. In some examples, upon detecting the change in the orientation of the wearable device 104, the wearable device may alert the user. In one example, the alert may include a vibration of the wearable device 104. Additionally, or alternatively, the alert may include a visual message (e.g., displayed on a user device 106 in communication with the wearable device 104) instructing the user to change or correct the orientation of the wearable device 104.

Further, in response to the change in orientation, the wearable device 104 may activate or deactivate one or more optical transmitters 315 or one or more optical receivers 310. For instance, the wearable device 104 may activate sensors that are facing the palm-side of the user's finger in the determined orientation (rather than the sensors facing the back side of the user's finger in the determined orientation) so that the newly activated sensors may be used to acquire physiological data with higher accuracy.

A user's "skin tone metric" may be a function of both the level of melanin in the skin as well as the amount of blood flow in the skin. For example, assuming a user's skin in a particular location exhibits a constant level of melanin, the perceived color (e.g., skin tone metric) of the skin may change depending on the level of blood flow (e.g., skin appears darker when there is more blood flow in the area, and lighter when there is less blood flow). The level of blood flow may change based on the user's environment (e.g., surrounding temperature), whether the user is exercising, and based on other physiological responses (e.g., vasoconstriction caused by shock or stress may change the level of blood flow, which affects the perceived color/skin tone metric of the skin).

In additional or alternative implementations, perceived "skin tone metrics" determined or calculated by the systems described herein may be based on or otherwise influenced by other physiological characteristics, such as hair and other skin variations, such as freckles, birthmarks, moles, etc. In other words, when determining skin tone metrics for a user, techniques described herein may configured to identify multiple physiological characteristics which may affect physiological data measurement, such as the level of blood flow, level of melanin, hair, other skin variations (e.g., freckles, birthmarks, moles), and the like.

In this regard, the wearable device 104 may determine one or more physiological measurements using the one or more skin tone metrics in combination with other metrics. In particular, for a given orientation (e.g., constant location of skin), the wearable device 104 may be configured to assume a constant level of melanin in the skin, and may be configured to interpret changing skin tone metrics as being a result of changing levels of blood flow. In other words, if the wearable device 104 determines that a skin tone metric for the user has changed (but the wearable device 104 is in the same orientation, and therefore measuring physiological data through the same tissue), the wearable device 104 may determine changing levels of blood flow based on the changing skin tone metrics.

As one example, the wearable device 104 may determine a level of blood flow of the user of the wearable device 104 using a combination of the one or more skin tone metrics and a temperature metric associated with the user. For example, the wearable device may determine blood flow has decreased if the temperature metric decreases and the skin tone metrics indicate a lighter skin tone (e.g., when compared to the baseline skin tone metrics).

If blood flow decreases significantly (e.g., below a threshold), this may be indicative of a stress response from the user (e.g., as a result of a car accident or any other traumatic event, which may result in stress/shock that causes vasoconstriction in the blood vessels, resulting in decreased blood flow). Additionally or alternatively, if heart rate or heart rate variability increases significantly, this may be indicative of a stress response from the user. As such, upon detecting the stress response, the wearable device 104 may generate an alert and send the alert to one or more user devices 106 associated with the wearable device 104. In other words, the wearable device 104 may be configured to determine whether changing levels of blood flow or changing levels of heart rate or heart rate variability are attributable to changing temperatures or due to some other physiological response such as stress or shock. For instance, if it is cold out, decreasing levels of blood flow are likely due to the low temperatures. Comparatively, if it is warm out, decreasing levels of blood flow are likely due to some other physiological response, such as vasoconstriction caused by stress/shock.

The methods as described herein may allow a wearable device to determine one or more skin tone metrics associated with the user of a wearable device 104. Skin tone may be considered noise in other physiological measurements (e.g., such as blood oxygen saturation). As such, determining the one or more skin tone metrics may allow the wearable device 104 to effectively account for the skin tone of the user when performing other physiological measurements, thereby resulting in more accurate physiological metrics for the user.

Figure 4:
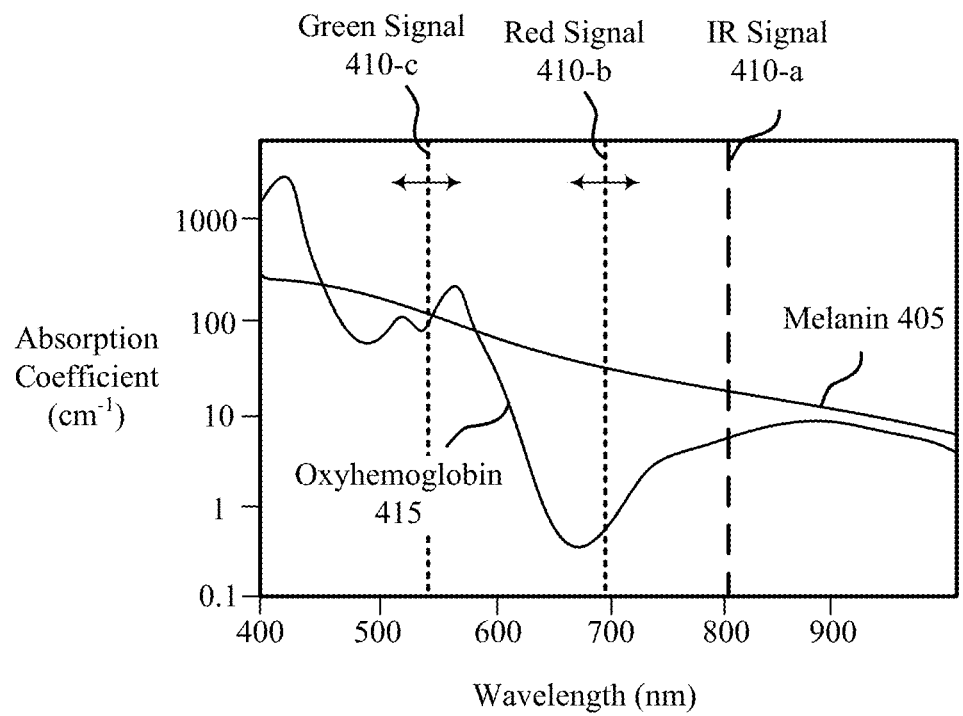
FIG. 4 illustrates an example of a graph that supports techniques for measuring skin tone using a wearable device in accordance with aspects of the present disclosure.

FIG. 4 illustrates an example of a graph 400 that supports techniques for measuring skin tone using a wearable device in accordance with aspects of the present disclosure. The graph 400 may illustrate an absorption coefficient of oxyhemoglobin 415 and an absorption coefficient of melanin 405 for different wavelengths of light (e.g., green light, red light, and IR light). In some examples, aspects of a system 100, a system 200, and a system 300 may utilize aspects of the graph 400. For example, the wearable device 104 may utilize the aspects of the graph 400 to determine one or more physiological measurements (e.g., skin tone metrics) of a user of the wearable device 104.

As described with reference to FIG. 2, an optical transmitter of a wearable device 104 may transmit one or more light signals (e.g., one or more of a green signal 410-c, a red signal 410-b, or an IR signal 410-a) to one or more optical receivers of the wearable device 104 to determine physiological data associated with the user. In one example, the wearable device 104 may determine a blood oxygen saturation level associated with the user (e.g., an amount of oxyhemoglobin in the blood of the user). In such examples, the optical transmitter may transmit the red signal 410-b and the IR signal 410-a through one or more layers (e.g., epidermal layers and blood vessels) of the finger to the optical receiver. Using the optical receiver, the wearable device may determine a signal strength of the red signal 410-b and the IR signal 410-a, and may compare the signal strengths of the red signal 410-b and the IR signal 410-a to determine an SpO2 level for the user.

As shown in FIG. 4, the absorption coefficient for oxyhemoglobin 415 for the red signal 410-b (e.g., absorption coefficient equals approximately 0.8 cm$^{-1}$) is substantially smaller than the IR signal 410-a (e.g., absorption coefficient equals approximately 17 cm$^{-1}$). An absorption coefficient may indicate how far into a material light of a particular wavelength can penetrate before it is absorbed. As such, lower absorption coefficients may indicate that light is poorly absorbed, where higher absorption coefficients may indicate that light is strongly absorbed. As such, the red signal 410-b is poorly absorbed by the oxyhemoglobin 415 and can therefore be used as a reference for the IR signal 410-a when determining the blood oxygen saturation level for the user.

However, as described with reference to FIG. 3, other characteristics of a user's skin tissue may contribute to the absorption of the light signals. For example, a skin tone of the user may contribute to the absorption of the light signals and more specifically, the skin tone of the user may affect the absorption of the respective wavelengths of light. As shown in FIG. 4, the absorption coefficient for melanin 405 for the red signal 410-b (e.g., absorption coefficient equals approximately 50 cm$^{-1}$) is larger than the IR signal 410-a (e.g., absorption coefficient equals approximately 20 cm$^{-1}$). Thus, the absorption of the red signal 410-b may not only be due to the oxyhemoglobin 415, but also the melanin 405 in the skin.

As described herein, the wearable device 104 may determine skin tone metrics for the user and calibrate other physiological metrics of the user using the skin tone metric. As described in FIG. 3, the optical transmitter may transmit a red signal 410-b, an IR signal 410-a, and a green signal 410-c through one or more layers (e.g., upper epidermal layers) of the finger to the optical receiver. The wearable device 104 may then determine a skin tone metric for the user. In particular, the absorption coefficient for IR light (e.g., IR signal 410-a) may be relatively constant for varying skin tones. Comparatively, the absorption coefficients for green light (e.g., green signal 410-c) and red light (e.g., red signal 410-b) may change with varying degrees relative to the absorption coefficient for IR light as skin tone changes. As such, differences in absorption coefficients between IR light and green light, and between IR light and red light, may be used to approximate skin tone metrics of a user.

For example, a wearable device 104 may estimate a skin tone metric for a user by determining a difference in signal strength of the received red signal 410-b and the received IR signal 410-a, and a difference in signal strength between of the received green signal 410-c and the received IR signal 410-a (e.g., estimate skin tone by comparing $\Delta_{1,IR-Green}$ and $\Delta_{2,IR-Red}$). Using the skin tone metric, the wearable device 104 may calibrate future physiological measurements by increasing or decreasing a power level associated with the optical transmitter, increasing or decreasing the burn time of the optical transmitter (e.g., how long the optical transmitter emits light), or adjusting an algorithm for analyzing light received at the optical receiver which is described in detail with reference to FIG. 3. In the case of determining the blood oxygen saturation level, the wearable device 104 may increase/decrease a power level of the optical transmitter or increase/decrease the burn time of the optical transmitter when the optical transmitter is transmitting the red signal 410-b.

Figure 5:
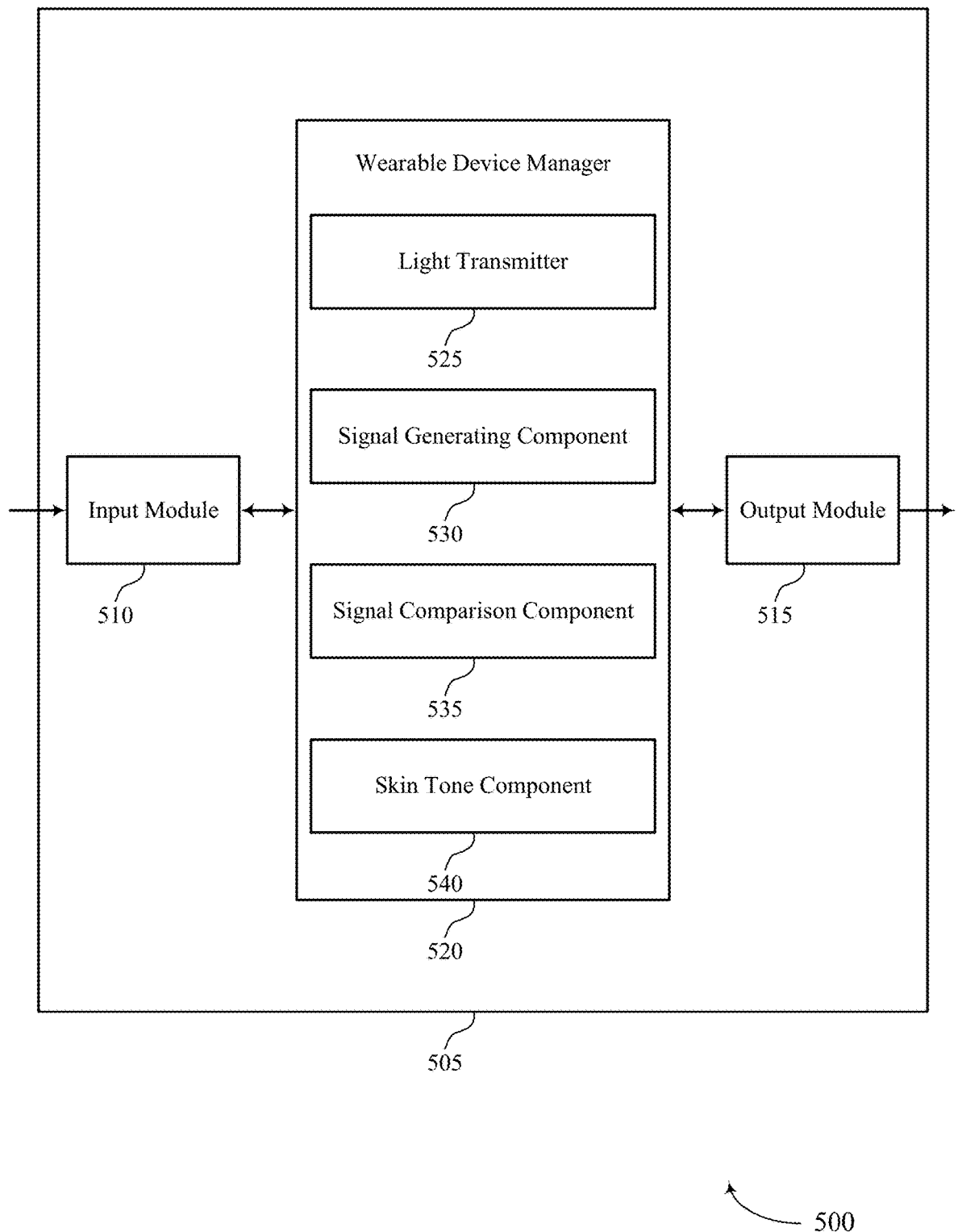
FIG. 5 illustrates a block diagram of an apparatus that supports techniques for measuring skin tone using a wearable device in accordance with aspects of the present disclosure.

FIG. 5 illustrates a block diagram 500 of a device 505 that supports techniques for measuring skin tone using a wearable device in accordance with aspects of the present disclosure. The device 505 may include an input module 510, an output module 515, and a wearable device manager 520. The device 505 may also include a processor. Each of these components may be in communication with one another (e.g., via one or more buses).

For example, the wearable device manager 520 may include a light transmitter 525, a signal generating component 530, a signal comparison component 535, a skin tone component 540, or any combination thereof. In some examples, the wearable device manager 520, or various components thereof, may be configured to perform various operations (e.g., receiving, monitoring, transmitting) using or otherwise in cooperation with the input module 510, the output module 515, or both. For example, the wearable device manager 520 may receive information from the input module 510, send information to the output module 515, or be integrated in combination with the input module 510, the output module 515, or both to receive information, transmit information, or perform various other operations as described herein.

The light transmitter 525 may be configured as or otherwise support a means for transmitting, using one or more light-emitting components of a wearable device associated with a user, first light associated with a first wavelength, second light associated with a second wavelength, and third light associated with a third wavelength. The signal generating component 530 may be configured as or otherwise support a means for generating a first signal, a second signal, and a third signal based at least in part on the first light, the second light, and the third light, respectively, received at one or more photodetectors of the wearable device. The signal comparison component 535 may be configured as or otherwise support a means for determining a first difference between the first signal and the second signal, and a second difference between the first signal and the third signal. The skin tone component 540 may be configured as or otherwise support a means for determining a skin tone metric associated with the user based at least in part on a comparison between the first difference and the second difference.

Figure 6:
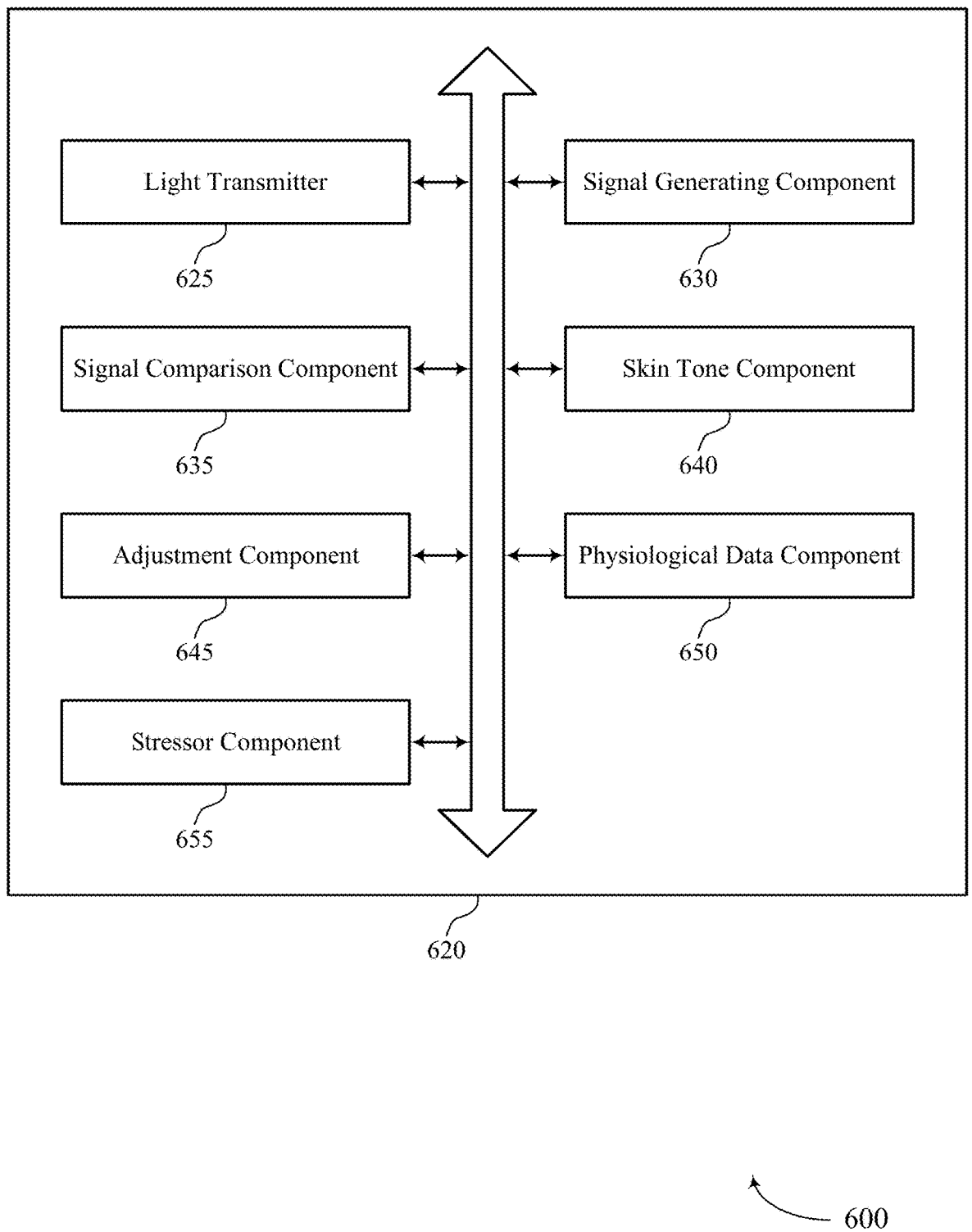
FIG. 6 illustrates a block diagram of a wearable device manager that supports techniques for measuring skin tone using a wearable device in accordance with aspects of the present disclosure.

FIG. 6 illustrates a block diagram 600 of a wearable device manager 620 that supports techniques for measuring skin tone using a wearable device in accordance with aspects of the present disclosure. The wearable device manager 620 may be an example of aspects of a wearable device manager or a wearable device manager 520, or both, as described herein. The wearable device manager 620, or various components thereof, may be an example of means for performing various aspects of techniques for measuring skin tone using a wearable device as described herein. For example, the wearable device manager 620 may include a light transmitter 625, a signal generating component 630, a signal comparison component 635, a skin tone component 640, an adjustment component 645, a physiological data component 650, a stressor component 655, or any combination thereof. Each of these components may communicate, directly or indirectly, with one another (e.g., via one or more buses).

The light transmitter 625 may be configured as or otherwise support a means for transmitting, using one or more light-emitting components of a wearable device associated with a user, first light associated with a first wavelength, second light associated with a second wavelength, and third light associated with a third wavelength. The signal generating component 630 may be configured as or otherwise support a means for generating a first signal, a second signal, and a third signal based at least in part on the first light, the second light, and the third light, respectively, received at one or more photodetectors of the wearable device. The signal comparison component 635 may be configured as or otherwise support a means for determining a first difference between the first signal and the second signal, and a second difference between the first signal and the third signal. The skin tone component 640 may be configured as or otherwise support a means for determining a skin tone metric associated with the user based at least in part on a comparison between the first difference and the second difference.

In some examples, the adjustment component 645 may be configured as or otherwise support a means for determining one or more measurement parameters associated with the user, the wearable device, or both, based at least in part on the skin tone metric. In some examples, the physiological data component 650 may be configured as or otherwise support a means for acquiring physiological data from the user via the wearable device based at least in part on the one or more measurement parameters.

In some examples, the one or more measurement parameters comprise a power level associated with the one or more light-emitting components, a burn time associated with the one or more light-emitting components, an algorithm for analyzing light received by the one or more photodetectors, or any combination thereof.

In some examples, the skin tone component 640 may be configured as or otherwise support a means for determining a baseline skin tone metric associated with the user based at least in part on additional light transmitted by the one or more light-emitting components and received by the one or more photodetectors. In some examples, the adjustment component 645 may be configured as or otherwise support a means for determining an orientation of the wearable device relative to the user based at least in part on a comparison between the skin tone metric and the baseline skin tone metric.

In some examples, the adjustment component 645 may be configured as or otherwise support a means for selectively adjusting an activation state of one or more sensors associated with the wearable device based at least in part on the orientation, wherein the one or more sensors comprise the one or more light-emitting components, the one or more photodetectors, additional sensors, or any combination thereof. In some examples, the physiological data component 650 may be configured as or otherwise support a means for acquiring physiological data associated with the user via the wearable device based at least in part on selectively adjusting the activation state of the one or more sensors.

In some examples, the adjustment component 645 may be configured as or otherwise support a means for generating, via the wearable device, a user device associated with the wearable device, or both, an instruction for the user to adjust the orientation of the wearable device.

In some examples, the light transmitter 625 may be configured as or otherwise support a means for transmitting the first light using a first light-emitting component of the one or more light-emitting components during a first time interval. In some examples, the light transmitter 625 may be configured as or otherwise support a means for transmitting the second light using a second light-emitting component of the one or more light-emitting components during a second time interval. In some examples, the light transmitter 625 may be configured as or otherwise support a means for transmitting the third light using a third light-emitting component of the one or more light-emitting components during a third time interval.

In some examples, the signal generating component 630 may be configured as or otherwise support a means for generating the first signal based at least in part on the first light received by the one or more photodetectors during the first time interval. In some examples, the signal generating component 630 may be configured as or otherwise support a means for generating the second signal based at least in part on the second light received by the one or more photodetectors during the second time interval. In some examples, the signal generating component 630 may be configured as or otherwise support a means for generating the third signal based at least in part on the third light received by the one or more photodetectors during the third time interval.

In some examples, the physiological data component 650 may be configured as or otherwise support a means for acquiring physiological data associated with the user via the wearable device. In some examples, the physiological data component 650 may be configured as or otherwise support a means for determining a blood oxygen saturation metric associated with the user based at least in part on the physiological data, wherein determining the skin tone metric is based at least in part on the blood oxygen saturation metric.

In some examples, to support determining the skin tone metric, the adjustment component 645 may be configured as or otherwise support a means for selectively adjusting the skin tone metric based at least in part on the blood oxygen saturation metric.

In some examples, the skin tone metric is associated with a level of melanin and a level of blood flow associated with the user, and the physiological data component 650 may be configured as or otherwise support a means for acquiring temperature data via the wearable device. In some examples, the skin tone metric is associated with a level of melanin and a level of blood flow associated with the user, and the physiological data component 650 may be configured as or otherwise support a means for determining the level of blood flow associated with the user based at least in part on the skin tone metric and the temperature data.

In some examples, the stressor component 655 may be configured as or otherwise support a means for determining a stress metric associated with the user based at least in part on the level of blood flow.

In some examples, the first wavelength comprises a first wavelength range associated with infrared light, the second wavelength comprises a second wavelength range associated with red light, and the third wavelength comprises a third wavelength range associated with green light. In some examples, the wearable device comprises a wearable ring device.

Figure 7:
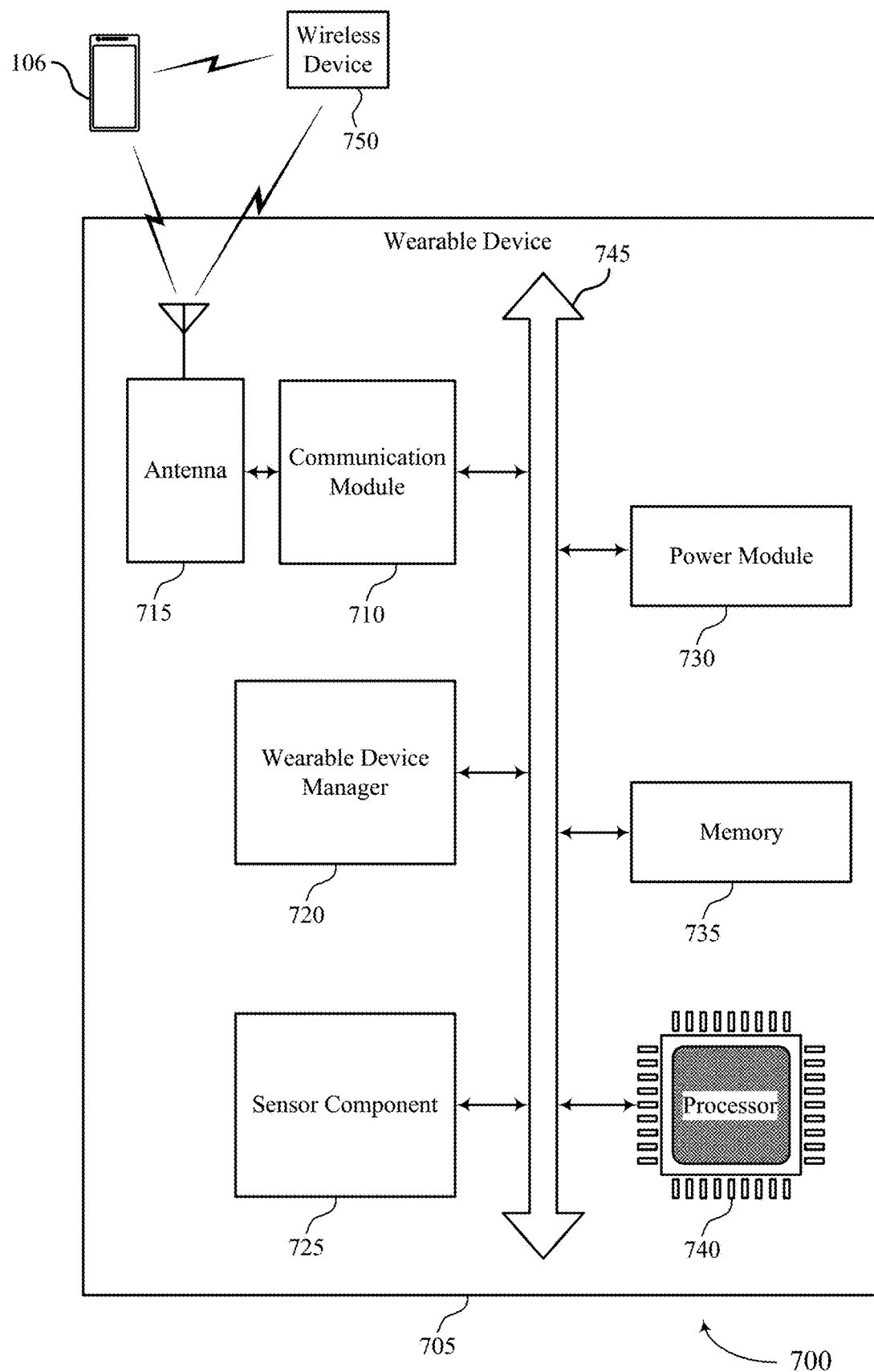
FIG. 7 illustrates a diagram of a system including a device that supports techniques for measuring skin tone using a wearable device in accordance with aspects of the present disclosure.

FIG. 7 illustrates a diagram of a system 700 including a device 705 that supports techniques for measuring skin tone using a wearable device in accordance with aspects of the present disclosure. The device 705 may be an example of or include the components of a device 505 as described herein. The device 705 may include an example of a wearable device 104, as described previously herein. The device 705 may include components for bi-directional communications including components for transmitting and receiving communications with a user device 106 and a server 110, such as a wearable device manager 720, a communication module 710, an antenna 715, a sensor component 725, a power module 730, a memory 735, a processor 740, and a wireless device 750. These components may be in electronic communication or otherwise coupled (e.g., operatively, communicatively, functionally, electronically, electrically) via one or more buses (e.g., a bus 745).

For example, the wearable device manager 720 may be configured as or otherwise support a means for transmitting, using one or more light-emitting components of a wearable device associated with a user, first light associated with a first wavelength, second light associated with a second wavelength, and third light associated with a third wavelength. The wearable device manager 720 may be configured as or otherwise support a means for generating a first signal, a second signal, and a third signal based at least in part on the first light, the second light, and the third light, respectively, received at one or more photodetectors of the wearable device. The wearable device manager 720 may be configured as or otherwise support a means for determining a first difference between the first signal and the second signal, and a second difference between the first signal and the third signal. The wearable device manager 720 may be configured as or otherwise support a means for determining a skin tone metric associated with the user based at least in part on a comparison between the first difference and the second difference.

By including or configuring the wearable device manager 720 in accordance with examples as described herein, the device 705 may support techniques for calibrating physiological metrics associated with the user such that the wearable device may provide more accurate physiological data to the user.

Figure 8:
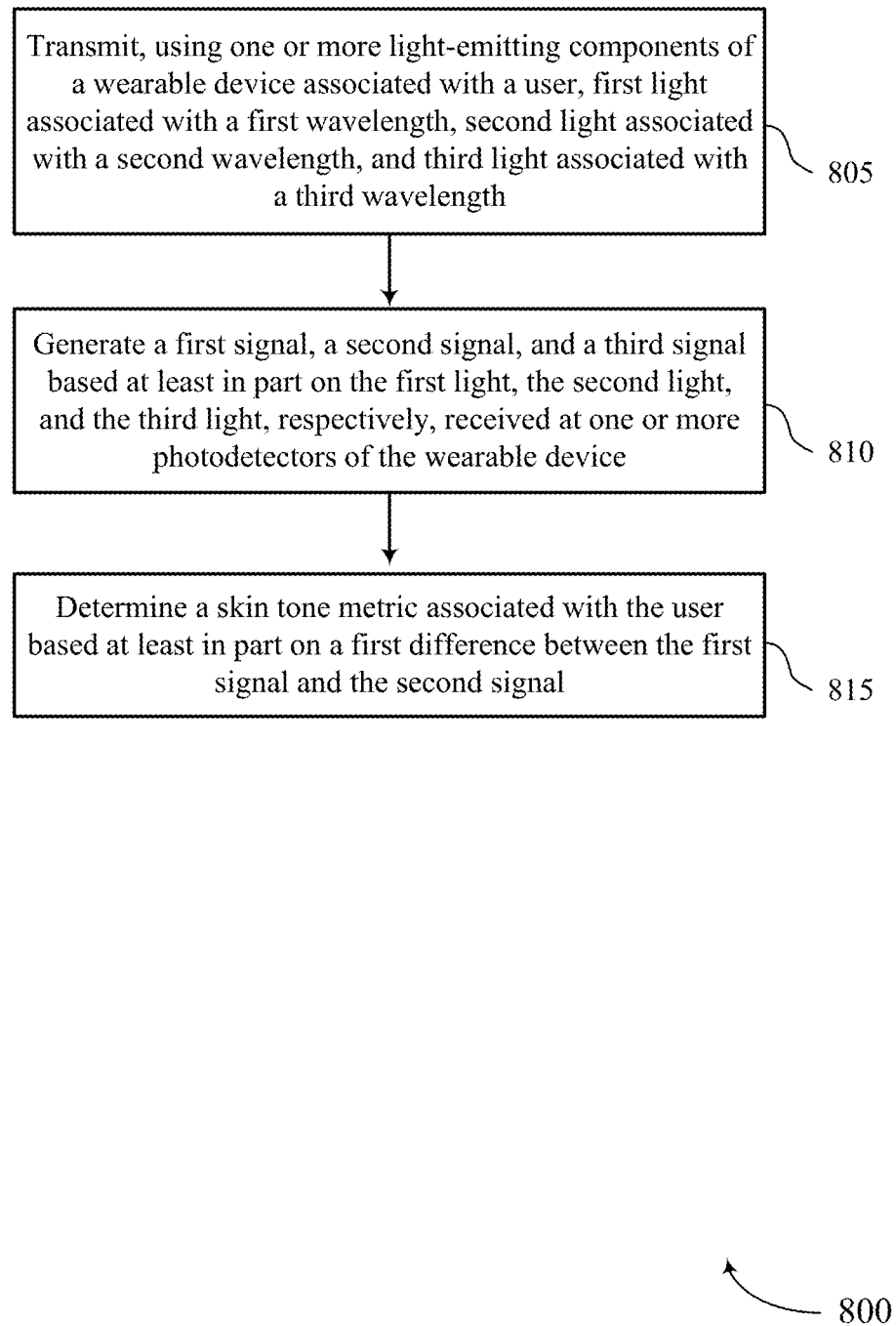
FIGS. 8 and 9 illustrate flowcharts showing methods that support techniques for measuring skin tone using a wearable device in accordance with aspects of the present disclosure.

FIG. 8 illustrates a flowchart showing a method 800 that supports techniques for measuring skin tone using a wearable device in accordance with aspects of the present disclosure. The operations of the method 800 may be implemented by a wearable device or its components as described herein. For example, the operations of the method 800 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 805, the method may include transmitting, using one or more light-emitting components of a wearable device associated with a user, first light associated with a first wavelength and second light associated with a second wavelength. The operations of 805 may be performed in accordance with examples as disclosed herein. In some examples, aspects of the operations of 805 may be performed by a light transmitter 625 as described with reference to FIG. 6.

At 810, the method may include generating a first signal and a second signal based at least in part on the first light and the second light, respectively, received at one or more photodetectors of the wearable device. The operations of 810 may be performed in accordance with examples as disclosed herein. In some examples, aspects of the operations of 810 may be performed by a signal generating component 630 as described with reference to FIG. 6.

At 815, the method may include determining a skin tone metric associated with the user based at least in part on a first difference between the first signal and the second signal. The operations of 815 may be performed in accordance with examples as disclosed herein. In some examples, aspects of the operations of 815 may be performed by a skin tone component 640 as described with reference to FIG. 6.

Figure 9:
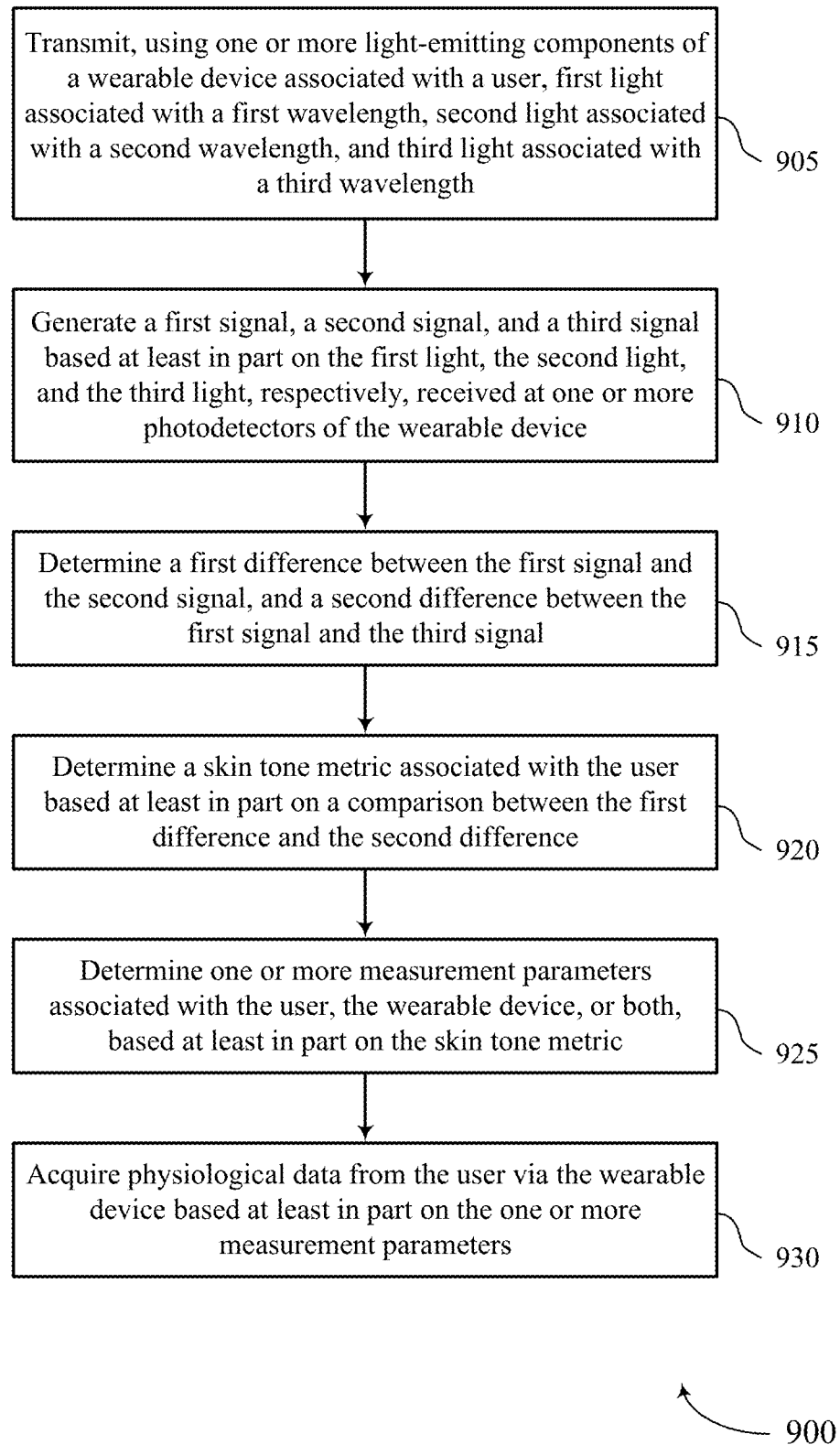

FIG. 9 illustrates a flowchart showing a method 900 that supports techniques for measuring skin tone using a wearable device in accordance with aspects of the present disclosure. The operations of the method 900 may be implemented by a wearable device or its components as described herein. For example, the operations of the method 900 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 905, the method may include transmitting, using one or more light-emitting components of a wearable device associated with a user, first light associated with a first wavelength, second light associated with a second wavelength, and third light associated with a third wavelength. The operations of 905 may be performed in accordance with examples as disclosed herein. In some examples, aspects of the operations of 905 may be performed by a light transmitter 625 as described with reference to FIG. 6.

At 910, the method may include generating a first signal, a second signal, and a third signal based at least in part on the first light, the second light, and the third light, respectively, received at one or more photodetectors of the wearable device. The operations of 910 may be performed in accordance with examples as disclosed herein. In some examples, aspects of the operations of 910 may be performed by a signal generating component 630 as described with reference to FIG. 6.

At 915, the method may include determining a first difference between the first signal and the second signal, and a second difference between the first signal and the third signal. The operations of 915 may be performed in accordance with examples as disclosed herein. In some examples, aspects of the operations of 915 may be performed by a signal comparison component 635 as described with reference to FIG. 6.

At 920, the method may include determining a skin tone metric associated with the user based at least in part on a comparison between the first difference and the second difference. The operations of 920 may be performed in accordance with examples as disclosed herein. In some examples, aspects of the operations of 920 may be performed by a skin tone component 640 as described with reference to FIG. 6.

At 925, the method may include determining one or more measurement parameters associated with the user, the wearable device, or both, based at least in part on the skin tone metric. The operations of 925 may be performed in accordance with examples as disclosed herein. In some examples, aspects of the operations of 925 may be performed by an adjustment component 645 as described with reference to FIG. 6.

At 930, the method may include acquiring physiological data from the user via the wearable device based at least in part on the one or more measurement parameters. The operations of 930 may be performed in accordance with examples as disclosed herein. In some examples, aspects of the operations of 930 may be performed by a physiological data component 650 as described with reference to FIG. 6.

It should be noted that the methods described above describe possible implementations, and that the operations and the steps may be rearranged or otherwise modified and that other implementations are possible. Furthermore, aspects from two or more of the methods may be combined.

A method is described. The method may include transmitting, using one or more light-emitting components of a wearable device associated with a user, first light associated with a first wavelength, second light associated with a second wavelength, and third light associated with a third wavelength, generating a first signal, a second signal, and a third signal based at least in part on the first light, the second light, and the third light, respectively, received at one or more photodetectors of the wearable device, determining a first difference between the first signal and the second signal, and a second difference between the first signal and the third signal, and determining a skin tone metric associated with the user based at least in part on a comparison between the first difference and the second difference.

An apparatus is described. The apparatus may include a processor, memory coupled with the processor, and instructions stored in the memory. The instructions may be executable by the processor to cause the apparatus to transmit, using one or more light-emitting components of a wearable device associated with a user, first light associated with a first wavelength and second light associated with a second wavelength, generate a first signal and a second signal based at least in part on the first light and the second light, respectively, received at one or more photodetectors of the wearable device, determine a first difference between the first signal and the second signal, and determine a skin tone metric associated with the user based at least in part on the first difference.

Another apparatus is described. The apparatus may include means for transmitting, using one or more light-emitting components of a wearable device associated with a user, first light associated with a first wavelength and second light associated with a second wavelength, means for generating a first signal and a second signal based at least in part on the first light and the second light, respectively, received at one or more photodetectors of the wearable device, means for determining a first difference between the first signal and the second signal, and means for determining a skin tone metric associated with the user based at least in part on the first difference.

A non-transitory computer-readable medium storing code is described. The code may include instructions executable by a processor to transmit, using one or more light-emitting components of a wearable device associated with a user, first light associated with a first wavelength and second light associated with a second wavelength, generate a first signal and a second signal based at least in part on the first light and the second light, respectively, received at one or more photodetectors of the wearable device, determine a first difference between the first signal and the second signal, and determine a skin tone metric associated with the user based at least in part on the first difference.

Some examples of the method, apparatuses, and non-transitory computer-readable medium described herein may further include operations, features, means, or instructions for determining one or more measurement parameters associated with the user, the wearable device, or both, based at least in part on the skin tone metric and acquiring physiological data from the user via the wearable device based at least in part on the one or more measurement parameters.

In some examples of the method, apparatuses, and non-transitory computer-readable medium described herein, the one or more measurement parameters comprise a power level associated with the one or more light-emitting components, a burn time associated with the one or more light-emitting components, an algorithm for analyzing light received by the one or more photodetectors, or any combination thereof.

Some examples of the method, apparatuses, and non-transitory computer-readable medium described herein may further include operations, features, means, or instructions for determining a baseline skin tone metric associated with the user based at least in part on additional light transmitted by the one or more light-emitting components and received by the one or more photodetectors and determining an orientation of the wearable device relative to the user based at least in part on a comparison between the skin tone metric and the baseline skin tone metric.

In some examples of the method, apparatuses, and non-transitory computer-readable medium described herein, selectively adjusting an activation state of one or more sensors associated with the wearable device based at least in part on the orientation, wherein the one or more sensors comprise the one or more light-emitting components, the one or more photodetectors, additional sensors, or any combination thereof and acquiring physiological data associated with the user via the wearable device based at least in part on selectively adjusting the activation state of the one or more sensors.

Some examples of the method, apparatuses, and non-transitory computer-readable medium described herein may further include operations, features, means, or instructions for generating, via the wearable device, a user device associated with the wearable device, or both, an instruction for the user to adjust the orientation of the wearable device.

Some examples of the method, apparatuses, and non-transitory computer-readable medium described herein may further include operations, features, means, or instructions for transmitting, using the one or more light-emitting components of the wearable device, third light associated with a third wavelength, generating a third signal based at least in part on the third light received at the one or more photodetectors, and determining a second difference between the first signal and the third signal, wherein determining the skin tone metric is based at least in part on a comparison between the first difference and the second difference.

Some examples of the method, apparatuses, and non-transitory computer-readable medium described herein may further include operations, features, means, or instructions for transmitting the first light using a first light-emitting component of the one or more light-emitting components during a first time interval, transmitting the second light using a second light-emitting component of the one or more light-emitting components during a second time interval, and transmitting the third light using a third light-emitting component of the one or more light-emitting components during a third time interval.

Some examples of the method, apparatuses, and non-transitory computer-readable medium described herein may further include operations, features, means, or instructions for generating the first signal based at least in part on the first light received by the one or more photodetectors during the first time interval, generating the second signal based at least in part on the second light received by the one or more photodetectors during the second time interval, and generating the third signal based at least in part on the third light received by the one or more photodetectors during the third time interval.

Some examples of the method, apparatuses, and non-transitory computer-readable medium described herein may further include operations, features, means, or instructions for acquiring physiological data associated with the user via the wearable device and determining a blood oxygen saturation metric associated with the user based at least in part on the physiological data, wherein determining the skin tone metric may be based at least in part on the blood oxygen saturation metric.

In some examples of the method, apparatuses, and non-transitory computer-readable medium described herein, determining the skin tone metric may include operations, features, means, or instructions for selectively adjusting the skin tone metric based at least in part on the blood oxygen saturation metric.

In some examples of the method, apparatuses, and non-transitory computer-readable medium described herein, the skin tone metric may be associated with a level of melanin and a level of blood flow associated with the user and the method, apparatuses, and non-transitory computer-readable medium may include further operations, features, means, or instructions for acquiring temperature data via the wearable device and determining the level of blood flow associated with the user based at least in part on the skin tone metric and the temperature data.

Some examples of the method, apparatuses, and non-transitory computer-readable medium described herein may further include operations, features, means, or instructions for determining a stress metric associated with the user based at least in part on the level of blood flow.

In some examples of the method, apparatuses, and non-transitory computer-readable medium described herein, the first wavelength comprises a first wavelength range associated with infrared light, the second wavelength comprises a second wavelength range associated with red light, and the third wavelength comprises a third wavelength range associated with green light.

In some examples of the method, apparatuses, and non-transitory computer-readable medium described herein, the first wavelength is associated with a first isosbestic point between oxyhemoglobin and deoxyhemoglobin, and the second wavelength is associated with a second isosbestic point between oxyhemoglobin and deoxyhemoglobin.

In some examples of the method, apparatuses, and non-transitory computer-readable medium described herein, the wearable device comprises a wearable ring device.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
    transmitting, using one or more light-emitting components of a wearable device associated with a user, first light associated with a first wavelength, second light associated with a second wavelength, and third light associated with a third wavelength, wherein the one or more light-emitting components comprise at least one diode;
    generating a first signal, a second signal, and a third signal based at least in part on the first light, the second light, and the third light, respectively, received at one or more photodetectors of the wearable device;
    determining a first difference between the first signal and the second signal, and a second difference between the first signal and the third signal;
    determining a skin tone metric associated with the user based at least in part on a comparison between the first difference and the second difference; and
    adjusting a power level associated with the one or more light-emitting components of the wearable device based at least in part on the skin tone metric.
2. The method of claim 1, further comprising:
    determining one or more measurement parameters associated with the user, the wearable device, or both, based at least in part on the skin tone metric, wherein adjusting the power level is based at least in part on the one or more measurement parameters; and acquiring physiological data from the user via the wearable device based at least in part on the one or more measurement parameters and based at least in part on adjusting the power level associated with the one or more light-emitting components.

3. The method of claim 2, wherein the one or more measurement parameters comprise the power level associated with the one or more light-emitting components, a burn time associated with the one or more light-emitting components, an algorithm for analyzing light received by the one or more photodetectors, or any combination thereof.

4. A method comprising:

determining a baseline skin tone metric associated with a user based at least in part on light transmitted by one or more light-emitting components of a wearable device associated with the user and received by one or more photodetectors of the wearable device, wherein the one or more light-emitting components comprise at least one diode;

transmitting, using the one or more light-emitting components, first light associated with a first wavelength and second light associated with a second wavelength;

generating a first signal and a second signal based at least in part on the first light and the second light, respectively, received at the one or more photodetectors of the wearable device;

determining a skin tone metric associated with the user based at least in part on a difference between the first signal and the second signal;

determining an orientation of the wearable device relative to the user based at least in part on a comparison between the skin tone metric and the baseline skin tone metric; and adjusting a power level associated with the one or more light-emitting components of the wearable device based at least in part on the orientation.

5. The method of claim 4, further comprising:

selectively adjusting an activation state of one or more sensors associated with the wearable device based at least in part on the orientation, wherein the one or more sensors comprise the one or more light-emitting components, the one or more photodetectors, additional sensors, or any combination thereof; and acquiring physiological data associated with the user via the wearable device based at least in part on selectively adjusting the activation state of the one or more sensors.

6. The method of claim 4, further comprising:

generating, via the wearable device, a user device associated with the wearable device, or both, an instruction for the user to adjust the orientation of the wearable device.

7. The method of claim 1, further comprising:

transmitting the first light using a first light-emitting component of the one or more light-emitting components during a first time interval;

transmitting the second light using a second light-emitting component of the one or more light-emitting components during a second time interval; and transmitting the third light using a third light-emitting component of the one or more light-emitting components during a third time interval.

8. The method of claim 7, further comprising:

generating the first signal based at least in part on the first light received by the one or more photodetectors during the first time interval;

generating the second signal based at least in part on the second light received by the one or more photodetectors during the second time interval; and generating the third signal based at least in part on the third light received by the one or more photodetectors during the third time interval.

9. The method of claim 1, wherein the first wavelength comprises a first wavelength range associated with infrared light, the second wavelength comprises a second wavelength range associated with red light, and the third wavelength comprises a third wavelength range associated with green light.

10. The method of claim 1, further comprising:

acquiring physiological data associated with the user via the wearable device; and determining a blood oxygen saturation metric associated with the user based at least in part on the physiological data, wherein determining the skin tone metric is based at least in part on the blood oxygen saturation metric.

11. The method of claim 10, wherein determining the skin tone metric comprises:

selectively adjusting the skin tone metric based at least in part on the blood oxygen saturation metric.

12. The method of claim 1, wherein the skin tone metric is associated with a level of melanin and a level of blood flow associated with the user, the method further comprising:

acquiring temperature data via the wearable device; and determining the level of blood flow associated with the user based at least in part on the skin tone metric and the temperature data.

13. The method of claim 12, further comprising:

determining a stress metric associated with the user based at least in part on the level of blood flow.

14. The method of claim 1, wherein the first wavelength is associated with a first isosbestic point between oxyhemoglobin and deoxyhemoglobin, and wherein the second wavelength is associated with a second isosbestic point between the oxyhemoglobin and the deoxyhemoglobin.

15. The method of claim 1, wherein the wearable device comprises a wearable ring device.

16. An apparatus, comprising:

at least one processor;

at least one memory coupled with the at least one processor; and instructions stored in the at least one memory and executable by the at least one processor to cause the apparatus to:

transmit, using one or more light-emitting components of a wearable device associated with a user, first light associated with a first wavelength, second light associated with a second wavelength, and third light associated with a third wavelength, wherein the one or more light-emitting components comprise at least one diode;

generate a first signal, a second signal, and a third signal based at least in part on the first light, the second light, and the third light, respectively, received at one or more photodetectors of the wearable device;

determine a first difference between the first signal and the second signal, and a second difference between the first signal and the third signal;

determine a skin tone metric associated with the user based at least in part on a comparison between the first difference and the second difference; and adjust a power level associated with the one or more light-emitting components of the wearable device based at least in part on the skin tone metric.

17. The apparatus of claim 16, wherein the instructions are further executable by the at least one processor to cause the apparatus to:

determine one or more measurement parameters associated with the user, the wearable device, or both, based at least in part on the skin tone metric, wherein adjusting the power level is based at least in part on the one or more measurement parameters; and acquire physiological data from the user via the wearable device based at least in part on the one or more measurement parameters and based at least in part on adjusting the power level associated with the one or more light-emitting components.

18. The apparatus of claim 16, wherein the instructions are further executable by the at least one processor to cause the apparatus to:

determine a baseline skin tone metric associated with the user based at least in part on additional light transmitted by the one or more light-emitting components and received by the one or more photodetectors; and determine an orientation of the wearable device relative to the user based at least in part on a comparison between the skin tone metric and the baseline skin tone metric.

* * * * *